INVENTOR.
Nathan Most

Sept. 18, 1962  N. MOST  3,054,571
SPINNING REEL
Filed Aug. 22, 1960  3 Sheets-Sheet 3
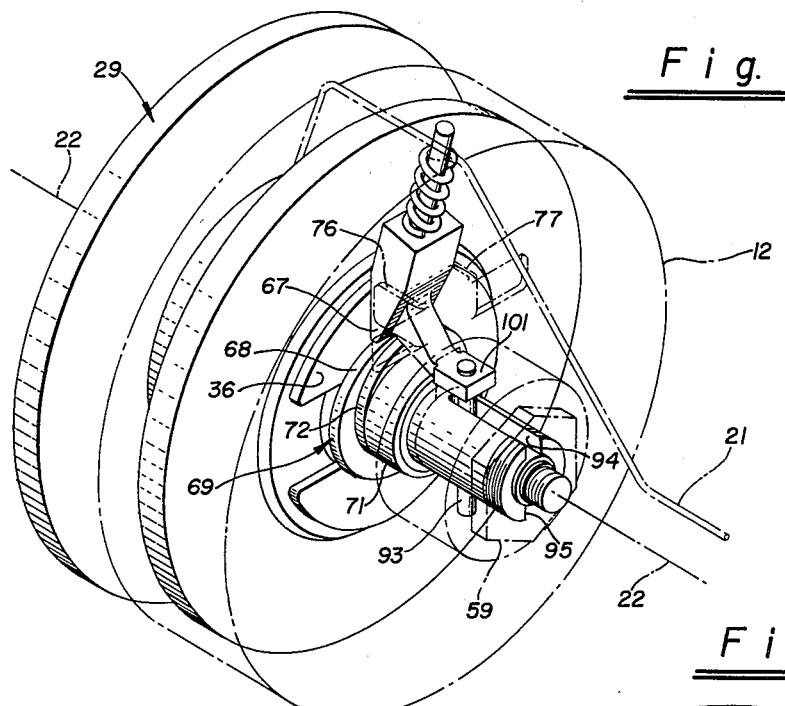
Fig. 5
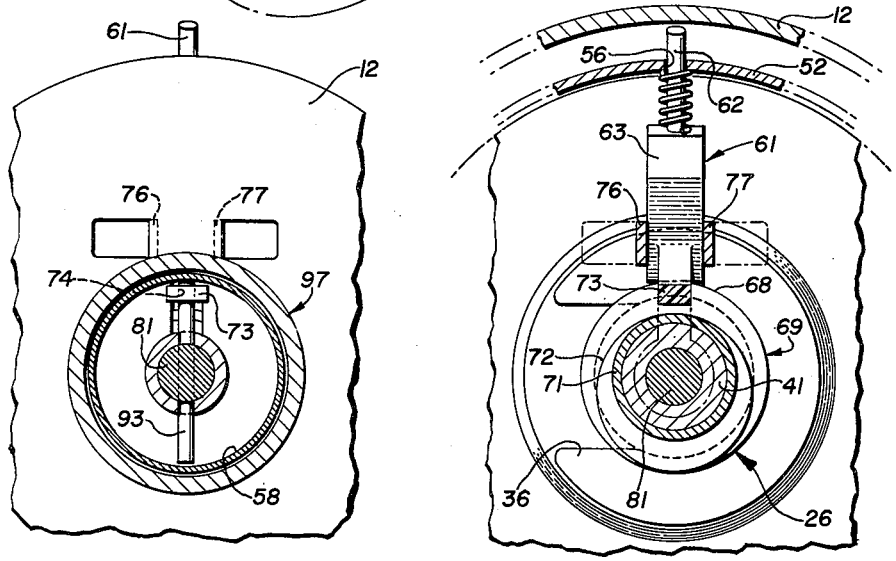
Fig. 6
Fig. 7
INVENTOR.
Nathan Most
BY
*Lothrop & West*
Attorneys 3,054,571
SPINNING REEL
Nathan Most, Atherton, Calif., assignor, by mesne assignments, to Union Tank Car Company, Chicago, Ill., a corporation of New Jersey
Filed Aug. 22, 1960, Ser. No. 51,088
7 Claims. (Cl. 242—84.2)

My invention relates primarily to reels useful to anglers. The reel is primarily for attachment to a casting rod and is effective to assist in casting line from the reel and in retrieving the line. The reel, as well, is helpful in controlling the line during the cast and during retrieval thereof.

Numerous different forms of spinning reels have of late years come into the market and many of them are represented in the patent literature. Commercially they are classified as open reels and closed face reels. The instant invention is especially concerned with reels of the closed face type.

It is an object of the invention to provide a spinning reel in which the mechanism for retrieving and respooling or rewinding the line is easily and accurately actuated.

Another object of the invention is to provide a retrieving mechanism which is readily made inoperative before and during a cast.

Another object of the invention is to provide a spinning reel having a single control for the casting function and for a braking function.

Another object of the invention is to provide a spinning reel in which the line cup for assisting in handling the line is held against axial movement so that it is always positioned at an optimum axial location for handling the line.

Another object of the invention is to provide a very simple and economical mechanism for the indicated purposes.

A still further object of the invention is to improve in general spinning reels of the indicated type.

These objects together with others are attained in the embodiment of the invention described in the accompanying description and illustrated in the accompanying drawings in which:

FIGURE 5 is an isometric view of a portion of the reel to a somewhat enlarged scale and with certain parts being shown in phantom.

FIGURE 6 is a fragmentary view showing parts of the reel in elevation and in cross section, the plane of the section being indicated by the line 6—6 of FIGURE 1.

FIGURE 7 is a view somewhat similar to FIGURE 6 but showing parts in cross section, the plane of which is indicated by the line 7—7 of FIGURE 1.

Figure 1:
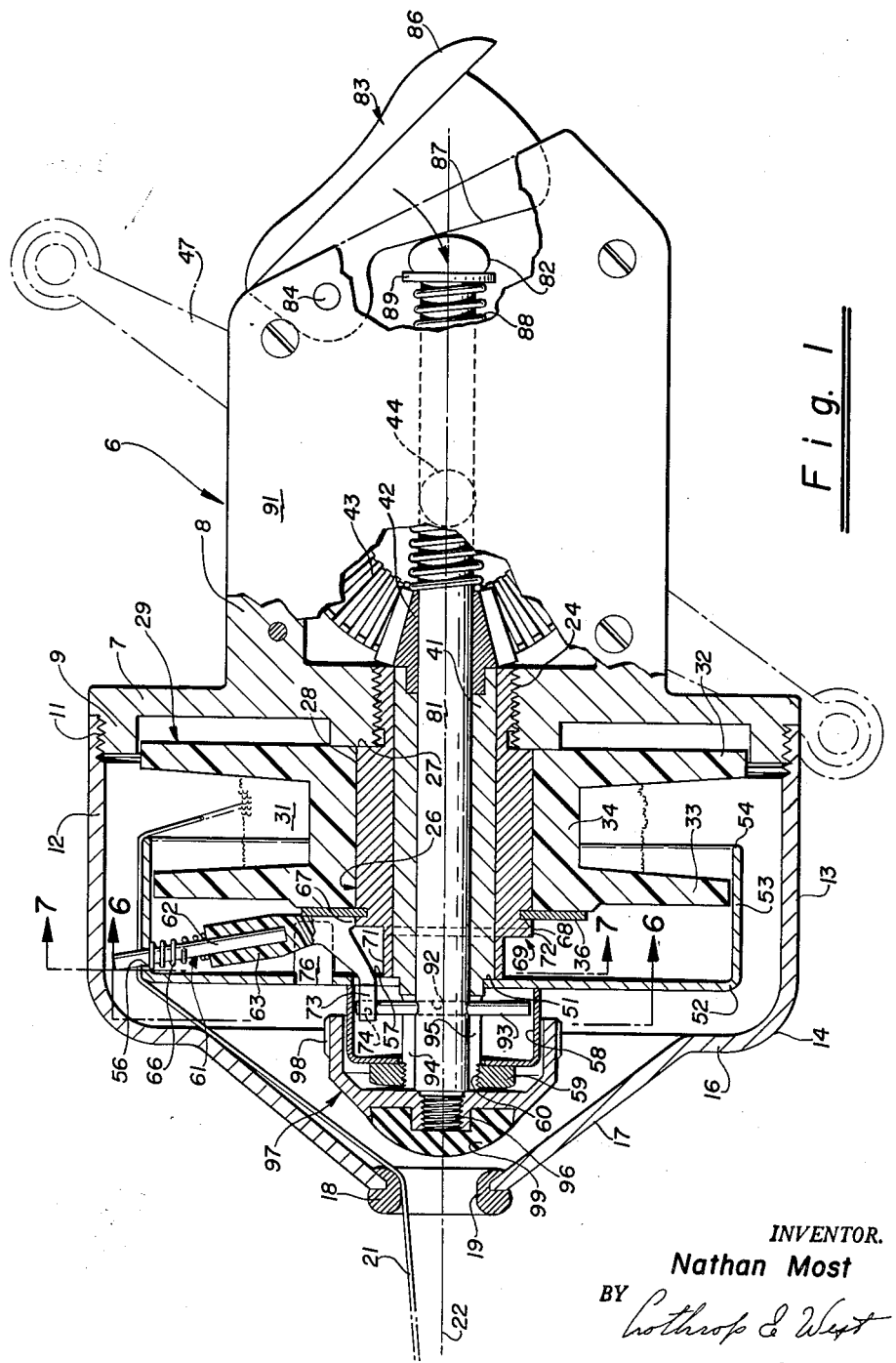
FIGURE 1 is a side elevation with portions broken away to show the interior construction on an axial or diametrical plane, the parts being in retrieving position and the scale of the reel being enlarged.
Figure 2:
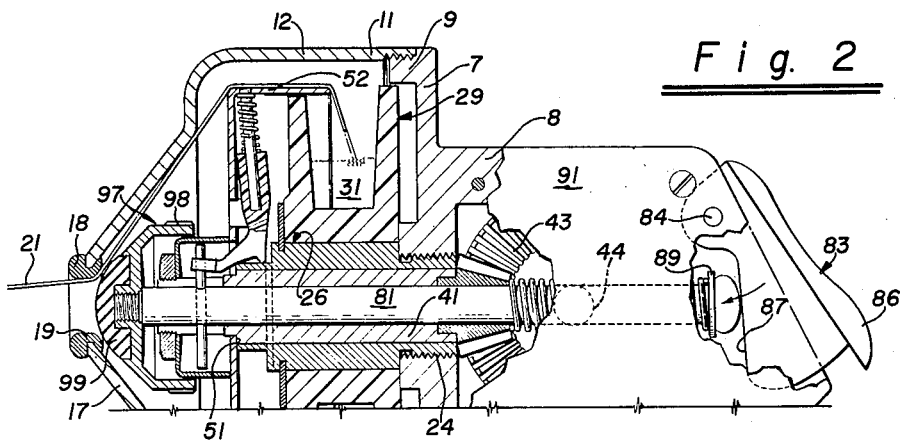
FIGURE 2 is a view similar to FIGURE 1 but to a smaller scale and showing the interior parts of the reel in a different position, suitable for casting.
Figure 3:
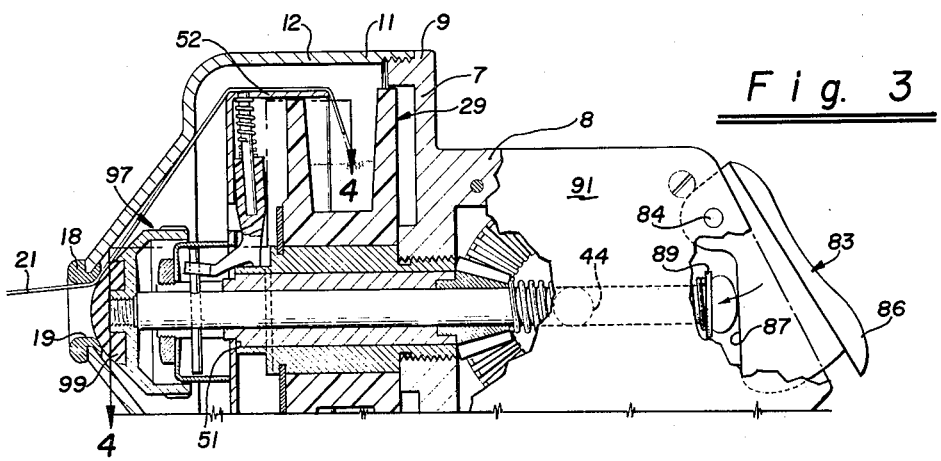
FIGURE 3 is a view similar to FIGURE 2 but showing the parts in a further different position, suitable for snubbing or braking.
Figure 4:
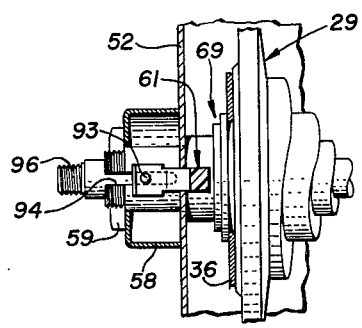
FIGURE 4 is a sectional view, the plane of section being indicated by the lines 4—4 of FIGURE 3 with parts removed for clarity.

While the spinning reel pursuant to the invention can be and has been incorporated in a number of different embodiments or forms, it has been successfully made and operated substantially as shown herein. In this arrangement, there is provided a frame 6. This usually is a metal casting such as a die casting having a transverse wall 7 of substantially circular configuration and with which a hollow housing 8 is incorporated. The frame 6 adjacent the periphery of the wall 7 has a flange 9 and a threaded rim 11 to receive a closure or cap 12 conveniently fabricated in metal by spinning. The cap 12 has a generally circular cylindrical flange 13, a rounded shoulder 14, an inturned approximately planar portion 16 and a conical portion 17 terminating in an annulus 18 of wear-resistant material. The annulus defines a central opening 19 through which the line 21 is maneuvered, the opening 19 being concentric with the longitudinal, central axis 22 of the device. The structure is, for the most part, symmetrical about the axis 22.

Conveniently mounted on the frame 6 preferably by left-handed threads 24 is a sleeve 26 having its own axis coincident with the axis 22 and having a shoulder 27 so that the sleeve can be tightly screwed home and in effect forms a detachable part of the frame 6, being stationary with respect to the frame during normal use.

The sleeve on its outer circular cylindrical surface 28 is designed rotatably to receive a line spool 29 of any of various different forms. In the present instance, the spool 29 stores a number of turns 31 of the line 21 and confines the line generally between an inner flange 32 and an outer flange 33 and around a central hub 34. The line spool 29 is held against the transverse wall 7 and against material axial translation along the sleeve by means of a standard retaining clip 36 sprung into a receiving groove cut into the sleeve 26. Thus, the line spool is free to rotate upon the sleeve but cannot move axially until the clip 36 has first been removed. This can be done by moving the clip transversely while slightly springing the clip material.

Extending through and journalled within the sleeve 26 is a drive tube 41 at one end firmly secured to and unitarily engaged with a bevel pinion 42. The tube 41 and pinion 42 can be of one piece, if desired. The pinion 42 abuts against the end of the sleeve 26 and so is restrained in one direction against axial movement. The pinion 42 is also in mesh with a bevel gear wheel 43 fast on a cross shaft 44 journalled in the frame 6. The shaft 44 carries an operating crank 47 so that upon rotation of the crank 47 the shaft 44 also rotates and carries the bevel gear wheel 43 with it. The rotation of the bevel gear wheel rotates the bevel pinion 42 at an increased rate and simultanetously rotates the drive tube 41. The drive tube near but spaced from its other end is formed with a shoulder 51 which is either completely circular or has one or more flats thereon.

Designed to engage the drive tube 41, particularly at the shoulder 51, is a line cup 52 conveniently fabricated as a stamping or spinning of light metal. The line cup has a central opening therein which closely follows the contour of the shoulder 51 so that the line cup is accurately positioned in light axial abutment with the end of the sleeve 26. The line cup is formed with a flange 53, the free edge 54 of which overlies the line spool 29 in a convenient overlapping location. It is a characteristic of the present device that the edge 54 remains substantially fixed with respect to the line spool 29 as to axial location so that the line 21 in reeling and unreeling always has a known path. The line cup 52 not only has a central aperture, but also is provided with an aperture 56 in the flange 53 and, furthermore, near its central portion is provided with an opening 57.

The line cup is held in position axially by a coaxial retaining cup 58. The cup preferably is a light metal member positioned by a nut 59 screwed onto threads 60 at the outer end of the drive tube 41. Particularly if the shoulder 51 is provided with a noncircular portion, the drive tube directly rotates the line cup 52 and by frictional engagement the nut 59 and the retaining cup 58 rotate in unison therewith. These rotating parts are held against axial translation except for that necessary for free rotation not only by the abutment of the line cup against the shoulder 51 on the drive tube, but also because the gear pinion 42 abuts the other end of the sleeve. With this construction, the line cup is free to rotate and is rotated by and with the drive mechanism but is incapable of substantial axial translation relative to the frame 6.

Extending through the aperture 56 is a line pin 61 having a number of different parts. The line pin includes a shaft 62 usually of wear-resistant metal which is loosely or freely received in the aperture 56. Not only can the shaft 62 move radially therein with considerable freedom, but also the shaft can tip or cock axially with respect to the line cup. The shaft 62 is embedded in a plastic foot 63 made of good anti-friction material and shaped to furnish an abutment for one end of a coil spring 66, the other end of which rests against the inner face of the flange 53. The spring 66 tends to urge the whole line pin mechanism in a radially inward direction and with an axially inward component.

The foot 63 has a follower portion 67 contoured in one position to adjoin the snap clip 36 and more particularly to rest upon a radially outward and axially inward portion 68 of a cam generally designated 69. The cam is largely or entirely formed as part of the sleeve 26. The portion 68 of the cam is circular cylindrical and is coaxial with the axis 22. The cam 69 has a radially inward and axially outward portion 71 (FIG. 5) of considerable axial extent and also conveniently formed as part of the sleeve 26. This portion 71 of the cam 69 is also circular cylindrical and coaxial with the axis 22. Between the portions 68 and 71 of the cam there is provided an intermediate ramp portion 72 (FIG. 5) which is sometimes made circular cylindrical but eccentric to the axis 22 and tangent to both concentric portions. In some instances the portion 72 is simply a pair of flats or at least one flat tangent to the surface 71 and extending to the surface 68. The width of the intermediate portion 72 and the width of the radially outward portion 68 are each about equal to the width of the follower portion 67.

The foot 63 is also formed with a controller 73 which extends outwardly through the opening 57 and in one position of the parts, as shown in FIGURE 1, is approximately parallel to the axis 22. The controller 73 has a hole 74 therethrough, the hole affording a loose fit and being generously rounded adjacent the exterior surfaces of the foot 63.

Serving as constraining guides for the foot 63, and in part for the entire line pin mechanism, are inturned substantially parallel tabs 76 and 77 preferably struck from the material of the line cup itself. The tabs are slidably engaged by the opposite, substantially flat sides of the foot 63, this portion of the foot having a substantially rectangular transverse cross section. In this way the inner part of the line pin, especially the foot, is kept from twisting but is free to move axially with respect to the line spool. The entire line pin is made to rotate with the line cup but is free to move radially with respect to the line spool so that the shaft 62 not only projects and retracts with regard to the flange 53, but also tips or cocks with respect thereto. The line pin cannot twist and must revolve together with the line cup.

To afford appropriate motion of the line pin, there is provided a central rod 81 extending entirely through the drive tube 41. The rod 81 at one end is provided with an enlargement 82. An actuating mechanism is provided for the rod 81. A thumb lever 83 is mounted on the frame 6 by means of a pivot pin 84 and is provided with a thumb surface 86 and an actuating surface 87. When the thumb lever is depressed or rotated clockwise, as seen in FIGURE 1, the actuating surface 87 in abutment with the enlargement 82 slides or translates the rod 81 to the left. When pressure is released from the thumb piece, a spring 88 surrounding the rod 81 restores the parts to initial position as shown in FIGURE 1. The spring at one end abuts the pinion gear 42 and at the other end abuts a washer 89 resting against the enlargement 82. By manipulating the lever 83 the user can control precisely the axial position of the rod 81. A removable cover plate 91 affords access to the spring and gear mechanism within the hollow housing 8.

Motion of the rod 81 is utilized to control the line pin 61. Adjacent its outward end the rod 81 is provided with a cross bore 92 receiving a lightly fitted cross pin 93 which extends radially and freely through the hole 74 in the controller portion 73 of the line pin foot 63. The cross pin 93 is slidably received in diametrically opposite slots 94 and 95 (FIG. 5) extending axially inwardly from the outer end of the drive tube. Rotational force can be transmitted by reason of the engagement of the cross pin 93 with the drive tube and with the extending foot of the line pin. Whether or not there may be flats at the center of the line cup 63, the rod 81, the line pin and the line cup always revolve in unison although there can be relative displacement either axially or radially or both.

In order to provide a braking function, the forward end of the rod 81 is provided with threads 96 and carries a brake button 97 having a knurled outer portion 98 and having a friction pad 99 firmly embedded therein. In one extreme position of the parts the pad 99 is disposed a substantial distance from the annulus 18. The proportions of the parts are such that when the rod 81 is fully translated toward the left in FIGURE 1 the friction pad 99 is in more or less firm engagement with the annulus 18 to serve as a friction brake on the line 21 passing between them.

In the operation of this structure and with the parts in the positions shown in FIGURE 1, for example, and with no thumb pressure on the lever 83, the user by turning the crank 47 revolves the drive tube 41 and also the line cup 52. The line pin is in projected position because the follower 67 of the foot rides upon the radially outermost portion of the cam 69. Thus, as it rotates the line cup distributes the line 21 as the line pin reeves the line in over the annulus 18 and through the cap 12, laying the line somewhat at random onto the wound turns 31 until sufficient line has been taken in.

When the user decides to cast, he releases the crank 47 and partially but not entirely depresses the thumb lever 83, thus partially but not entirely translating the rod 81 axially to the left in FIGURE 1. The translation of the rod 81 is sufficient so that the cross rod 93 with its relatively loose connection through the hole 74 moves the foot 63 almost all of the way but not entirely to the left. The motion of the lower part of the foot is largely axial and is adequate to pull the follower 67 forcibly off of the cam 68 over the intermediate portion 72 and, helped by the spring 66, onto the relatively wide radially innermost portion 71. In this position of the follower the outermost tip of the shaft 62 is within the aperture 56 just even with or slightly below the surface of the flange 53 well out of engagement with the line 21. The line 21 is then entirely free and unrestrained and the cast is made. If it is desired to limit the paying out of the line during casting, the user depresses the finger lever 83 somewhat farther, translating the rod 81 even farther to the left. This moves the cross pin 93 farther left and moves the follower 67 farther outward in an axial direction along the cam portion 71, but does not change its radial position appreciably. This movement is also accompanied by a movement of the friction pad 99 toward and against the line 21. By varying the thumb pressure on the lever 83, the amount of frictional retardation on the line 21 can be regulated.

When it is desired to retrieve the line, the thumb lever 83 is entirely released and the spring 88 tends to move the rod 81 to the right. This first retracts the friction pad 99 from engagement with the line 21, leaving the line free. Also, the axial movement of the rod 81 toward the right in FIGURE 1 carries the cross pin 93 and the foot 63 with it as well until such time as the follower 67 comes into abutment with the upstanding portion of the intermediate part 72 of the cam. Movement of the parts to the right is thereupon arrested. The user turns the crank 47 at least part of a turn. As soon as the follower 67 rotates away from the radial wall of the intermediate portion 72 of the cam and into the tangent portion thereof, the spring 88 urges the follower 67 even farther to the right until the follower 67 encounters or abuts the radially upright portion of the cam section 68. Upon further rotational movement of the crank 47 by the user the follower 67 rides radially upward on the eccentric portion of the cam until such time as the follower is moved radially outward to the concentric portion 68 of the cam, whereupon the follower is axially urged by the spring 88 to lie against the spring clip 36. This motion of the follower 67 is of course accompanied by comparable motion of the shaft 62 and of the entire line pin mechanism so that the spring 66 is recompressed, the end of the line pin is projected and the parts are all restored to the position shown in FIGURE 1.

To disassemble the reel, it is necessary merely to hold the frame 6 in one hand and to unscrew the cap 12 with the other. Then the brake button 97 is unscrewed while the crank 47 is held since this prevents the rod 81 from rotating. After the button 97 is withdrawn, the nut 59 is unscrewed. Then the cap 58 is lifted off, exposing the pin 93. The pin is approximately centered and is retained by the cap so that upon removal of the cap the pin 93 can be withdrawn in a radial direction and removed from the hole 74. Then the line cup can be lifted off the end of the drive tube. The arrangement is usually such that the controller portion of the foot is provided with an enlarged end 101 of somewhat greater extent than the opening through which the foot extends so that the line pin is not easily dislodged by the spring 66 and stays with the line cup. The spring clip 36 can then be removed and the line spool 29 replaced, if desired. Reassembly of the parts is by operations in the reverse order.

What is claimed is:

1. A spinning reel comprising a frame, a sleeve on said frame and having a central axis, means for holding a line spool on said sleeve, a drive tube journalled in and passing through said sleeve, means on said frame for rotating said drive tube, a line cup mounted on said drive tube and rotatable in conjunction therewith and having a flange extending over a line spool on said sleeve, there being an aperture in said flange and an opening in said line cup, means for holding said line cup against axial movement relative to said frame, a cam having radially and axially displaced portions on said sleeve, a line pin passing through said aperture, a foot on said line pin engaging said cam and extending through said opening, means for urging said foot against said cam, means on said line cup for guiding said line pin in an axial direction, a rod extending through said drive tube, and actuating means on said rod and engaging said foot for moving said line pin in an axial direction.

2. A spinning reel as in claim 1 in which said actuating means includes a transverse pin on said rod passing loosely through a hole in said foot.

3. A spinning reel as in claim 1 and including a spring urging said rod in one axial direction.

4. A spinning reel comprising a frame, a sleeve on said frame and having a central axis, means for mounting a line spool on said sleeve, a drive tube journalled in and passing through said sleeve, means for rotating said drive tube within said sleeve, a line cup mounted on said drive tube and rotatable in conjunction therewith and having a flange extending over said sleeve, there being an aperture in said flange and an opening in said line cup, means for holding said line cup and said drive tube against axial movement relative to said frame, a cam having radially and axially displaced portions on said sleeve, a line pin passing through said aperture, a foot on said line pin having a follower engaging said cam and a controller extending through said opening, means on said line cup for constraining said line pin to rotate in conjunction with said line cup, a spring for urging said follower toward said cam, a rod passing through said drive tube and axially movable therein, and means for transmitting axial movement of said rod to said controller.

5. A spinning reel comprising a frame, a line cup mounted for rotation on said frame about an axis, means for constraining said line cup against axial movement on said frame, a cam stationarily mounted on said frame and having radially and axially displaced portions, a line pin, means for mounting said line pin for rotation with and for radial projecting and retracting movement relative to said line cup, a foot included with said line pin and radially and axially movable relative to said line cup for engagement selectively with said cam portions, means for urging said foot against said cam, and means for imparting an axial component of movement to said foot.

6. A spinning reel comprising a frame, a sleeve on said frame and having a central axis, means for mounting a line spool on said sleeve, a drive tube journalled in and passing through said sleeve, means for rotating said drive tube within said sleeve, a line cup mounted on said drive tube and rotatable in conjunction therewith and having a flange extending over said sleeve, there being an aperture in said flange and an opening in said line cup, means for holding said line cup and said drive tube against axial movement relative to said frame, a cam on said sleeve, said cam having axially distinct portions, a line pin passing through said aperture, a foot on said line pin for engaging said portions of said cam, a spring for urging said foot toward said cam, a rod passing through said drive tube and axially movable therein, and means extending through said opening for transmitting axial movement of said rod to said foot.

7. A spinning reel comprising a frame, a sleeve on said frame having a central axis, a drive tube passing coaxially through said sleeve, a line cup fast on said drive tube, a flange on said line cup extending over said sleeve, there being an aperture in said flange and an opening in said line cup, means for holding said line cup and said drive tube against axial movement relative to said frame, a cam coaxially disposed within said cup and having axially distinct portions, means for holding said cam axial axial movement and against rotation relative to said frame, a line pin passing through said aperture, a foot on said line pin for engaging said portions of said cam, means for urging said foot toward said cam, a rod axially movable in said drive tube, and means passing through said opening for producing axial movement of said foot in accordance with axial movement of said rod.

References Cited in the file of this patent

UNITED STATES PATENTS

| 2,613,468 | Hand | Oct. 14, 1952 |
| 2,668,025 | Hull | Feb. 2, 1954 |
| 2,843,333 | Jones | July 15, 1958 |
| 2,854,200 | Montgomery | Sept. 30, 1958 |
| 2,862,679 | Denison et al. | Dec. 2, 1958 |
| 2,988,298 | Purnell | June 13, 1961 |

OTHER REFERENCES

Urfabriken, German application Ser. No. 1,074,911, printed Feb. 4, 1960 (Kl. 45h 89/02), 2 pp. spec., 1 sht. dwg.